April 15, 1969  K. WAGNER  3,438,314

PHOTOGRAPHIC CAMERA WITH FLASH UNIT

Filed May 25, 1966

INVENTOR.
KARL WAGNER
BY Michael J. Striker

United States Patent Office 3,438,314
Patented Apr. 15, 1969

3,438,314
PHOTOGRAPHIC CAMERA WITH FLASH UNIT
Karl Wagner, Ottobrunn, near Munich, Germany, assignor to Agfa-Gevaert Aktiengesellschaft, Leverkusen, Germany
Filed May 25, 1966, Ser. No. 552,840
Claims priority, application Germany, June 3, 1965, A 23,858
Int. Cl. G03b 15/035, 9/10
U.S. Cl. 95—11                                                          10 Claims

ABSTRACT OF THE DISCLOSURE

A photographic camera with a fixed diaphragm and an adjustable shutter wherein the shutter is adjusted to furnish shorter exposure times in response to decreasing shooting distance when the camera is used with an illuminating arrangement. The camera has an adjusting member for controlling the exposure time, an index or scale member on the adjusting member for indicating the various shooting distances, and a coupling device for providing an operative connection between the adjusting member and the shutter.

---

The present invention relates to photographic cameras in general, and more particularly to improvements in photographic cameras with built-in or detachable flash units. Still more particularly, the invention relates to improvements in photographic cameras with flash units wherein the exposure control assembly comprises a diaphragm defining a fixed aperture.

In presently known cameras with fixed diaphragm apertures, exposures with flash can be made only at a predetermined shooting distance or within a very narrow range of shooting distances.

Accordingly, it is an important object of the present invention to provide a photographic camera with fixed diaphragm aperture which may be utilized to make exposures with flash within a wide range of shooting distances.

Another object of the invention is to provide a camera of the just outlined characteristics which need not be provided with an f-stop computer.

A further object of the invention is to provide a photographic camera with a built-in or detachable flash unit which may be utilized to take pictures with flash illumination by resorting to films having different sensitivities.

An additional object of the invention is to provide a very simple photographic camera for use with flash and to construct and assemble the camera in such a way that its exposure control assembly may be readily manipulated by unskilled amateurs.

A concomitant object of the invention is to provide a novel operative connection between an adjusting device and an adjustable shutter for photographic cameras.

Another object of the invention is to provide a camera which is constructed in such a way that the user can make a satisfactory exposure with flash even if he or she does not know the guide number of the flashbulb or of the electronic unit which is used to produce artificial light.

Briefly stated, one feature of my invention resides in the provision of a photographic camera which comprises adjustable shutter means for providing a plurality of exposure times, diaphragm means defining a fixed aperture, a built-in or detachable flash unit including one or more flashbulbs or other suitable means for producing artificial light in the course of an exposure and having a predetermined guide number, adjusting means for the shutter means and movable to a plurality of positions each of which corresponds to a different exposure time, an index member, a scale member having graduations indicating various shooting distances, one of such members being movable with the adjusting means relative to the other member so that the index member may be placed into registry with any desired graduation of the scale member, and coupling means establishing an operative connection between the shutter means and the adjusting means so that the shutter means admits different amounts of artificial light in response to placing the index member into registry with different graduations of the scale member. Otherwise stated, and since the flashbulb of the flash unit produces artificial light for a predetermined interval of time, at least the majority of positions which the adjusting means can assume will result in selection of an exposure time which is shorter than the interval during which the flashbulb produces artificial light.

It can also be said that the effective guide number of the flashbulb complements the size of the fixed aperture and the selected shooting distance to insure that the camera will take a satisfactory picture as long as the selected position of the adjusting means reflects the actual shooting distance.

In accordance with another feature of my invention, the customary adjusting means for moving the objective along the optical axis in order to adjust the position of the objective as a function of the shooting distance may be coupled with the adjusting means for the shutter means so that a single adjustment suffices to properly position the objective and to select an optimum exposure time for taking pictures with flash at a given shooting distance. The connection between the two adjusting means is preferably adjustable to insure that the camera may be used with films having different sensitivities.

It is also within the purview of my invention to provide two or more scale members and two or more index members. Each scale member is utilized for a film having a given sensitivity. By properly staggering two or more scale members, a single index member can be used to pinpoint selected graduations on each such scale member.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawings, in which:

Figure 1:
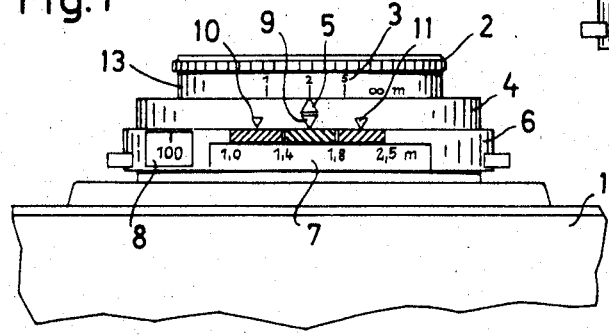
FIG. 1 is a fragmentary top plan view of a camera which embodies one form of my invention.
Figure 2:
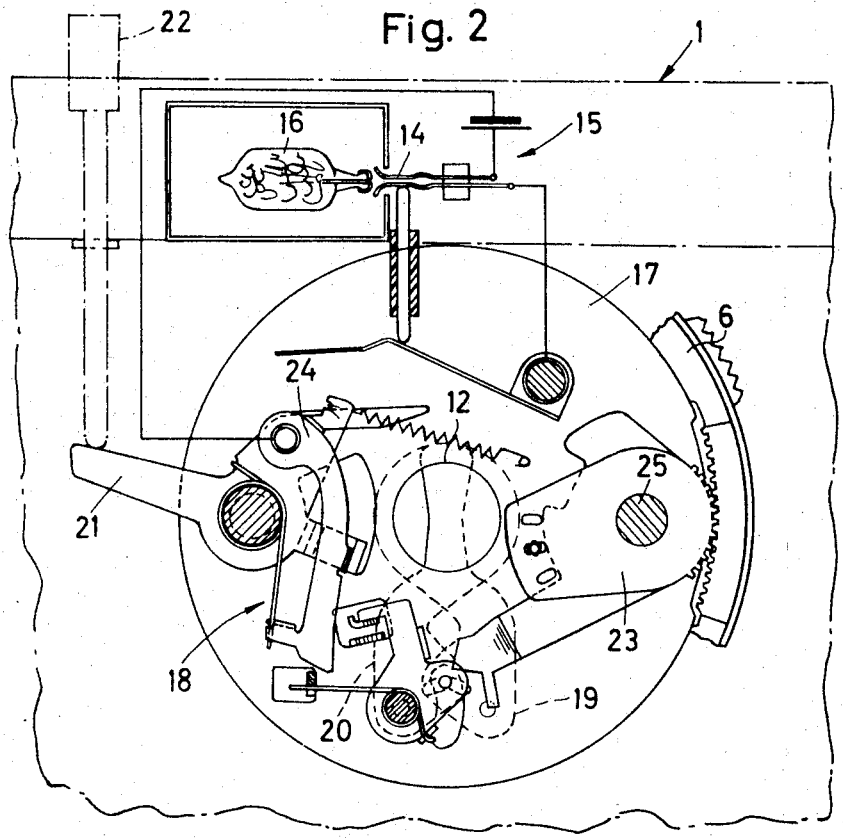
FIG. 2 is an enlarged fragmentary front elevational view of the camera and illustrates the operative connection between the adjusting means and the shutter means.

Referring first to FIGS. 1 and 2, there is shown a portion of a still camera which comprises a housing 1 carrying a fixed lens mount or support 4. The housing 1 accommodates a built-in flash unit 15 whose socket 14 can accommodate a flashbulb 16. This built-in flash unit can be replaced with a detachable electronic or otherwise constructed flash unit. All that counts is that the flashbulbs 16 used in the flash unit should have a predetermined guide number. For example, when the camera is loaded with film having a sensitivity of DIN 18, the guide number of the flashbulbs 16 will be 22.

The objective 13 of the camera shown in FIGS. 1 and 2 has a relative opening of 1:11 and the diaphragm is constituted by a platen 17 having a fixed aperture 12 whose size cannot be changed. The objective 13 may be moved with reference to the housing 1 and along the optical axis by means of an adjusting ring 2 which carries a graduated scale 3 calibrated in meters and cooperating with a fixed index 5 on the support 4. It is clear that the position of the scale 3 and index 5 can be reversed. The operator will rotate the adjusting ring 2 in order to place the pointer 5 into registry with that graduation of the scale 3 which indicates the exact shooting distance.

The shutter 18 of the camera is shown in FIG. 2. This shutter is adjustable so that it can provide a plurality of different exposure times. Its blades 19, 20 are mounted in a manner as disclosed, for example, in U.S. Patent No. 3,220,328 or in British Patent No. 889,984, both assigned to the assignee of the present application. Therefore, it suffices to say here that the shutter 18 comprises a release lever 21 which can be actuated by a depressible trigger 22 to operate an accelerator arm 24. The exact exposure time can be selected by means of an adjusting member 6 which resembles a ring (see FIG. 1) and which can select the position of a coupling member or catch plate 23. Each of the angular positions of the catch plate 23 corresponds to a different exposure time; this catch plate may be adjusted to four, five or even to an infinite number of different positions with reference to its pivot 25. In the illustrated embodiment, the adjusting member 6 can select exposure times of between 35 and 10 ms.

Figure 3:
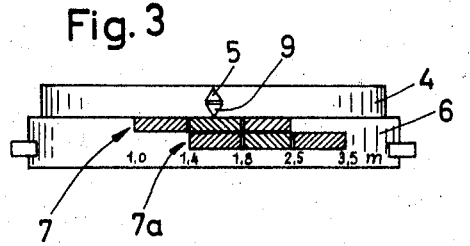
FIG. 3 is a view similar to that of FIG. 1 but showing a modified adjusting member.

In order to facilitate proper selection of exposure time for taking pictures with flash, the camera further comprises a graduated scale member 7 which is provided on the adjusting member 6 and an index member 9 on the fixed support 4. The adjusting member 6 further carries a scale 8 whose graduation will be placed into registry with the index member 9 when the camera is used for taking pictures in daylight. FIG. 1 shows that the adjusting member 6 carries two additional or supplemental index members 10, 11 whose purpose will be described in connection with FIG. 3.

In accordance with an important feature of my present invention, the coupling (including the catch plate 23) between the adjusting member 6 and the shutter 18 is such that, in the angular position shown in FIG. 1, the adjusting member 6 selects an exposure time of 25 ms. This is due to the fact that the index member 9 registers with that portion of the scale member 7 which extends between the graduations 1.4 and 1.8. If the index member 9 registers with the field between the graduations 1.0 and 1.4 of the scale member 7 (i.e., if the distance between the camera and the subject is between about 3 and 5 feet), the adjusting member 6 will set the shutter 18 for an exposure time of 18 ms. On the other hand, and if the index member 9 registers with the field between the graduations 1.8 and 2.5 of the scale member 7, the selected exposure time will be 35 ms. The adjusting member 6 can regulate the exposure time in such a way that only a certain amount of light produced by the flash bulb 16 will penetrate through the aperture 12 and will be allowed to reach the unexposed film frame, at least in two of the three aforedescribed settings of the shutter 16. In other words, at least when the shooting distance between the camera and the subject is less than the maximum distance indicated by the graduations of the scale member 7, the shutter 18 will close so rapidly that only a portion of light emitted by the flashbulb 16 and reflected from the subject in a direction toward the diaphragm will be allowed to pass through the aperture 12. The amount of light which is allowed to pass through the aperture 12 suffices to correspond to an effective guide number, which, together with the constant diaphragm aperture size, complements the selected shooting distance selected by the adjusting member 6 and pinpointed by the index member 9. The position of the scales 7, 8 and indices 9–11 may be reversed.

The index members 10, 11 are utilized when the camera is intended for use with films having different sensitivities. The adjusting member 6 then carries several scale members 7 each of which is used in connection with a different type of film and each of which co-operates with one of the index members 9 to 11. Alternately, and as actually shown in FIG. 3, the adjusting member 6 may be provided with a second scale member 7a which is staggered with reference to the scale member 7 and carries graduations indicating shooting distances of between 1.4 and 3.5 meters. When the camera is loaded with a film having a sensitivity other than 18 DIN, the operator will look at the index member 9 and will move such index member into registry with a selected graduation on the scale member 7a. The number of staggered scale members on the adjusting member 6 may be three or more, depending on the desired number of different film types which are to be used in my improved camera. It will be noted that a single index member 9 may be used in combination with several scale members.

In the camera of my invention, the exposure time is adjusted to take into account different shooting distances. As a rule, that film frame which is to be exposed will receive a maximum amount of light in response to setting of the adjusting member 6 for a maximum shooting distance. In all other instances, the shutter 18 will close before the flashbulb 16 ceases to produce light. The flashbulb normally supplies light for a period of about 1⁄50 of a second.

The novel connection between the adjusting member 6 and the shutter 18 may be utilized in cameras with built-in or detachable flash units as long as the element which emits light has a constant or nearly constant guide number. This is always the case when the flash unit utilizes AG–1 flashbulbs or so-called "Flashcubes." The flash unit requires no special adjustment for use in the camera of FIGS. 1 to 3.

Of course, the improved camera is susceptible of many additional modifications without departing from the spirit of my invention. For example, it is clear that the adjusting ring 2 of FIG. 2 may be coupled with the adjusting member 6 so that the adjustment of the objective 13 is carried out in automatic response to selection of the exposure time or vice versa. In order to allow for utilization of films having different film speeds, the connection between the adjusting ring 2 and adjusting member 6 is preferably adjustable so that the parts 2 and 6 may be coupled to each other in different angular positions.

Furthermore, the coupling between the adjusting member 6 and the shutter 18 may comprise a suitable retard mechanism, for example, a mechanism of the type disclosed in British Patent No. 951,794 which is assigned to the assignee of the present application.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. In a photographic camera, adjustable shutter means for providing a plurality of exposure times; diaphragm means defining a fixed aperture; a flash unit including means for producing artificial light and having a predetermined guide number; adjusting means for said shutter means, said adjusting means being movable to a plurality of positions each of which corresponds to a different exposure time; an index member; a scale member having graduations indicating different picture taking distances, one of said members being movable with said adjusting means relative to the other member; and coupling means providing an operative connection between said adjusting means and said shutter means so that said shutter means admits different amounts of artificial light varying in accordance with the particular picture taking distance indicated by the different positions of said index and said scale members relative to each other.

2. A structure as set forth in claim 1, wherein said flash unit is built into the camera.

3. A structure as set forth in claim 1, further comprising a fixed support, said index member being provided on said support.

4. A structure as set forth in claim 1, wherein the amount of artificial light admitted by said shutter means decreases with decreasing picture taking distance.

5. A structure as set forth in claim 1, wherein said flash unit is arranged to produce artificial light for a predetermined interval of time and wherein, at least in a majority of said positions thereof, said adjusting means selects an exposure time which is shorter than said interval.

6. A structure as set forth in claim 1, wherein the effective guide number of the amount of artificial light of said light producing means passing through said shutter means complements the fixed aperture and the selected picture taking distance.

7. A structure as set forth in claim 1, further comprising an objective movable along the optical axis and second adjusting means for moving said objective along said axis in response to movement of said first named adjusting means.

8. A structure as set forth in claim 7, further comprising a separable connection between said adjusting means.

9. In a photographic camera, adjustable shutter means for providing a plurality of exposure times; diaphragm means defining a fixed aperture; a flash unit including means for producing artificial light and having a predetermined guide number; adjusting means for said shutter means, said adjusting means being movable to a plurality of positions each of which corresponds to a different exposure time; an index member; a first scale member having graduations indicating various shooting distances, one of said members being movable with said adjusting means relative to the other member; coupling means providing an operative connection between said adjusting means and said shutter means so that said shutter means admits different amounts of artificial light in response to placing of said index member into registry with different graduations of said scale member; and a second scale member having a set of graduations indicating a range of shooting distances which is different from the range encompassed by the graduations of said first scale member, each of said scale members being utilized for indicating the shooting distance with a film of different sensitivity.

10. In a photographic camera, adjustable shutter means for providing a plurality of exposure times; diaphragm means defining a fixed aperture; a flash unit including means for producing artificial light and having a predetermined guide number; adjusting means for said shutter means, said adjusting means being movable to a plurality of positions each of which corresponds to a different exposure time; an index member; a first scale member having graduations indicating various shooting distances, one of said members being movable with said adjusting means relative to the other member; coupling means providing an operative connection between said adjusting means and said shutter means so that said shutter means admits different amounts of artificial light in response to placing of said index member into registry with different graduations of said scale member; at least one additional scale member; and at least one additional index member cooperating with said additional scale member, each of said scale members being utilized for indicating the shooting the shooting distance with a film of different sensitivity.

References Cited

UNITED STATES PATENTS

| 3,049,064 | 8/1962 | Fahlenberg | 95—53 |
| 3,120,791 | 2/1964 | Bundschuh et al. | 95—11 |
| 3,220,328 | 11/1965 | Jakob et al. | 95—11.5 |
| 3,257,920 | 6/1966 | Greger et al. | 95—11 |
| 3,257,921 | 6/1966 | Gorey | 95—11.5 |
| 3,296,947 | 1/1967 | Engelsmann et al. | 95—11.5 XR |

NORTON ANSHER, *Primary Examiner.*

FRED L. BRAUN, *Assistant Examiner.*

U.S. Cl. X.R.

95—53